(12) United States Patent
Mekic et al.

(10) Patent No.: US 12,326,536 B2
(45) Date of Patent: Jun. 10, 2025

(54) DETERMINATION OF FORMATION WATER SALINITY USING TIME RESOLVED CHLORINE CAPTURE GAMMA SPECTROSCOPY

(71) Applicant: Weatherford Technology Holdings, LLC, Houston, TX (US)

(72) Inventors: Natasa Mekic, Spring, TX (US); Richard Pemper, Sugar Land, TX (US); Gregory Schmid, Sugar Land, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 187 days.

(21) Appl. No.: 18/300,649

(22) Filed: Apr. 14, 2023

(65) Prior Publication Data

US 2024/0345282 A1 Oct. 17, 2024

(51) Int. Cl.
*G01V 5/10* (2006.01)

(52) U.S. Cl.
CPC .................................. *G01V 5/102* (2013.01)

(58) Field of Classification Search
CPC ........... G01V 5/102; G01V 5/101; G01V 5/10
See application file for complete search history.

(56) References Cited

U.S. PATENT DOCUMENTS

| 3,930,154 | A | * | 12/1975 | Scott | G01V 5/102 |
| | | | | | 376/160 |
| 4,020,342 | A | * | 4/1977 | Smith, Jr. | G01V 5/102 |
| | | | | | 250/262 |
| 4,424,444 | A | | 1/1984 | Smith, Jr. et al. | |
| 8,440,960 | B2 | | 5/2013 | Oraby et al. | |
| 9,031,790 | B2 | | 5/2015 | Thornton et al. | |
| 10,208,582 | B2 | | 2/2019 | Ma et al. | |
| 10,247,849 | B2 | | 4/2019 | Pfutzner et al. | |
| 10,466,384 | B2 | | 11/2019 | McKeon et al. | |
| 11,243,328 | B2 | | 2/2022 | Pemper et al. | |
| 2018/0058188 | A1 | | 3/2018 | Ma et al. | |

OTHER PUBLICATIONS

International Search Report and Written Opinion regarding corresponding PCT Application No. PCT/US2024/019353, mailed Jun. 5, 2024.

* cited by examiner

*Primary Examiner* — David P Porta
*Assistant Examiner* — Fani Polyzos Boosalis
(74) *Attorney, Agent, or Firm* — Lewis & Reese, PLLC (57) ABSTRACT

Methods and systems for determining formation salinity using pulsed neutron (PN) tools are described. Embodiments of the described methods involve binning chlorine yields or chlorine count rates arising from capture events into early and late capture regimes, which may be used to attribute the events to either the borehole or the formation.

20 Claims, 10 Drawing Sheets

DETERMINATION OF FORMATION WATER SALINITY USING TIME RESOLVED CHLORINE CAPTURE GAMMA SPECTROSCOPY

FIELD OF THE INVENTION

This application relates to methods and systems for wellbore logging, and more particularly to using a pulsed neutron logging (PNL) tool to determine formation water salinity.

INTRODUCTION

One of the major objectives in the oil and gas industry is to locate and evaluate the amount of oil and gas reserves in subsurface formations. Many surface and downhole logging technologies have been developed for this purpose. Examples include various pulsed neutron logging (PNL) techniques for determining the porosity of a formation and/or the composition of components present in the formation, resistivity measurements, and the like. The presence of chlorine within formation and borehole water can impact the accuracy of these methods. Specifically, the presence of chlorine is referred as salinity of water and represent an important parameter for evaluation of presence of hydrocarbons below the surface. For example, the presence of chlorine complicates PNL techniques because chlorine (a component of salinity) strongly absorbs neutrons. Likewise, salinity greatly impacts resistivity measurements.

Accordingly, there is a need in the art for techniques for evaluating salinity in hydrocarbon producing environments. It is also important to attribute the salinity to either the formation water and/or to water in the borehole.

SUMMARY

Disclosed herein is a method of determining salinity of water in a formation traversed by a borehole using a pulsed neutron (PN) tool deployable in the wellbore, wherein the PN tool comprises a source configured to issue bursts of fast neutrons, thereby irradiating the borehole and the formation with neutrons, and at least one detector configured to detect gamma photons resulting from the irradiating and arriving at the detector, the method comprising: (i) receiving data from a first of the at least one of the detectors, wherein the data comprises a time spectrum of gamma photon counts, (ii) binning the data into a first plurality of bins comprising gamma photon counts arising during a first duration of the time spectrum and a second plurality of bins comprising gamma photon counts arising during a second duration of the time spectrum, and (iii) using the first and second pluralities of bins to calculate the salinity. According to some embodiments, the time spectrum comprises: a burst duration comprising photon counts detected during the bursts, a capture duration comprising capture photon counts arising after the bursts, a sigma decay duration comprising photon counts arising from sigma decay, and a background duration comprising photon counts arising from background radiation. According to some embodiments, the first and second pluralities of bins each comprise gamma photon counts detected during the capture duration. According to some embodiments, the first plurality of bins comprises gamma photon counts arising during an early portion of the capture duration and the second plurality of bins comprises photon counts arising during a later portion of the capture duration, wherein the later portion is later in time than the early portion. According to some embodiments, a majority of photon counts of the first plurality of bins result from irradiation of the borehole and wherein a majority of photon counts of the second plurality of bins result from irradiation of the formation. According to some embodiments, calculating the salinity comprises determining the fractional contributions of the gamma photon counts of the first and second pluralities bins, respectively, to the total number of capture gamma photon counts. According to some embodiments, the fractional contribution of the gamma photon counts of the first plurality of bins is determined using the formula:

$$ECB\_Frac = ECB/(ECB + LCB),$$

where ECB_Frac is the fractional contribution of the gamma photon counts of the first plurality of bins, ECB is the gamma photon counts of the first plurality of bins, and LCB is the gamma photon counts of the second plurality of bins, and wherein the fractional contribution of the gamma photon counts of the second plurality of bins is determined using the formula:

$$LCB\_Frac = LCB/(ECB + LCB),$$

where LCB_Frac is the fractional contribution of the gamma photon counts of the second plurality of bins. According to some embodiments, calculating the salinity comprises determining a formation effect according to the formula:

$$\text{Formation Effect} = 1 - (ECB\_Frac/LCB\_Frac).$$

According to some embodiments, calculating the salinity comprises determining a formation factor by normalizing the formation effect over a logged interval using the PN tool according to the formula:

$$\text{Formation Factor} = abs(Min\_Formation\ Effect)/$$
$$(abs(Min\_Formation\ Effect) + Max\_Formation\ Effect)$$

where Min_Formation Effect is the minimum formation effect determined over the logged interval and Max_Formation Effect is the maximum formation effect determined over the logged interval. According to some embodiments, calculating the salinity comprises using an energy spectrum of capture gamma photons to spectrographically determine a chlorine yield. According to some embodiments, calculating the salinity comprises determining a chlorine yield attributable to the formation according to the formula:

$$FM\_Chlorine = (\text{Chlorine Yield}) * (\text{Formation Factor})$$

where FM_Chlorine is the chlorine yield attributable to the formation. According to some embodiments, the salinity of water in a formation is calculated by dividing the chlorine yield attributable to the formation by a chlorine sensitivity of the PN tool. According to some embodiments, the PN tool comprises more than one detector and the method comprises determining a formation effect for each of the detectors. According to some embodiments, the method further comprises obtaining a capture energy spectrum for each detector and determining a chlorine count rate for each detector from the respective capture energy spectra. According to some embodiments, the method further comprises using each detector's formation effect and chlorine count rate to determine, for each detector, a proportion of the chlorine count rate attributable to the formation. According to some embodiments, the method further comprises normalizing the proportion of the chlorine count rate attributable to the formation over each of the detectors.

Also disclosed herein are systems for executing any of the above-described methods. For example, disclosed herein is a system for determining salinity of water in a formation traversed by a borehole using a pulsed neutron (PN) tool deployable in the wellbore, wherein the PN tool comprises a source configured to issue bursts of fast neutrons, thereby irradiating the borehole and the formation with neutrons, and at least one detector configured to detect gamma photons resulting from the irradiating and arriving at the detector, the system comprising: a non-transitory computer readable storage medium comprising instructions, which when executed by a computer configure the computer to perform a method comprising: (i) receiving data from a first of the at least one of the detectors, wherein the data comprises a time spectrum of gamma photon counts, (ii) binning the data into a first plurality of bins comprising gamma photon counts arising during a first duration of the time spectrum and a second plurality of bins comprising gamma photon counts arising during a second duration of the time spectrum, and (iii) using the first and second pluralities of bins to calculate the salinity. According to some embodiments, the time spectrum comprises: a burst duration comprising photon counts detected during the bursts, a capture duration comprising capture photon counts arising after the bursts, a sigma decay duration comprising photon counts arising from sigma decay, and a background duration comprising photon counts arising from background radiation, wherein the first and second pluralities of bins each comprise gamma photon counts detected during the capture duration. According to some embodiments, the first plurality of bins comprises gamma photon counts arising during an early portion of the capture duration and the second plurality of bins comprises photon counts arising during a later portion of the capture duration, wherein the later portion is later in time than the early portion, and wherein a majority of photon counts of the first plurality of bins result from irradiation of the borehole and wherein a majority of photon counts of the second plurality of bins result from irradiation of the formation. According to some embodiments, calculating the salinity comprises determining the fractional contributions of the gamma photon counts of the first and second pluralities bins, respectively, to the total number of capture gamma photon counts.

Also disclosed herein are non-transitory computer-readable media comprising instructions, which when executed on a computer, configure the computer to perform any of the above-described methods.

DETAILED DESCRIPTION

This disclosure relates to methods and systems for evaluating water salinity using a pulsed neutron (PN) tool. According to some embodiments, the disclosed methods require only a single gamma photon detector. This offers an advantage over techniques requiring multiple detectors. The methods and systems described herein are also advantageous for open hole applications, especially for zones with invaded fluids, enlarged boreholes due to rock instability, and the like. The disclosed methods may be implemented using multi-detector tools, whereby the additional detector(s) may be used as a comparison for the data obtained at the primary (typically the closest) detector. But the additional detector(s) are not required to compensate for the first detector as in the prior art PN salinity measurements.

Figure 1:
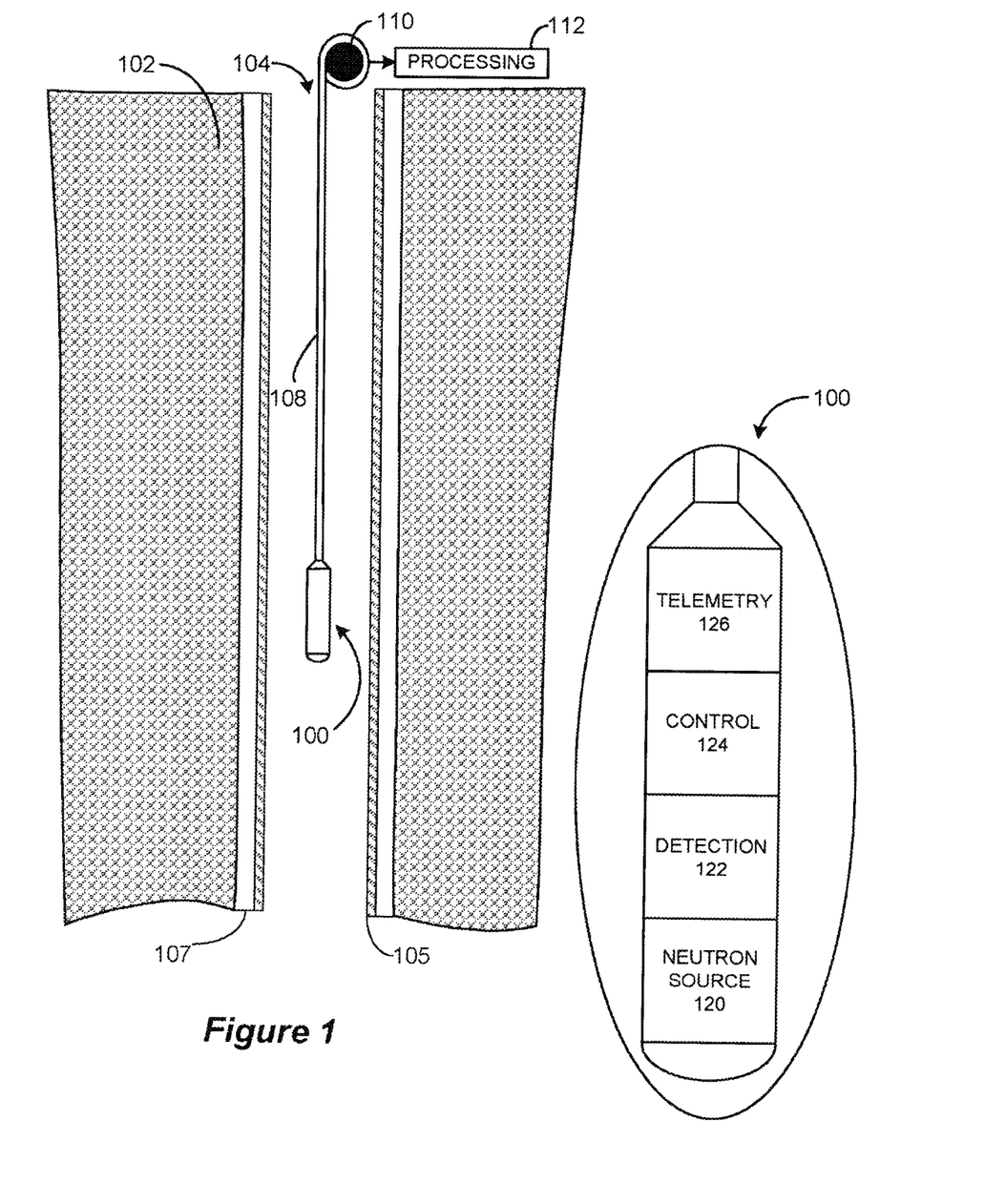
FIG. 1 shows deployment of an embodiment of a pulsed neutron (PN) tool.

FIG. 1 illustrates an embodiment of a PN tool 100 according to the disclosure. The illustrated tool 100 may more specifically be referred to as a geochemical logging tool. Geochemical logging tools use the physical principles of nuclear spectroscopy to ascertain the chemical content of subsurface formations and other components that the tool interrogates. Examples of how geochemical logging tools may be used to determine formation chemistry and matrix mineralogy are described in, for example, in U.S. Pat. Nos. 10,466,384 and 11,243,328 ("the '328 Patent"), the entire contents of which are incorporated herein by reference in their entirety. Other PN tools that do not provide detailed chemical compositions may also be used, as described below.

In the illustrated embodiment, the tool 100 is conveyed within the wellbore 104. The illustrated wellbore 104 is a cased wellbore having a casing 105 and cement 107. But other applications may involve deploying the tool in an open hole wellbore, as mentioned above. The tool 100 may be conveyed within the wellbore 104 by a wireline logging cable 108 that is connected to draw works 110 and a processing system 112 at the surface. The wireline logging cable 108 supports the weight of the tool 100 and acts as a data conduit between the processing system 112 and the tool 100. While the tool 100 is illustrated as being conveyed via wireline 108, it will be understood that the tool 100 could also be conveyed into the wellbore 104 in other ways such as via coiled tubing, drill string (e.g., during a logging while drilling operation), etc. According to some embodiments, the pulsed-neutron geochemical logging tool 100 may be run as part of a logging string that includes the spectral gamma ray, density, and neutron porosity tools.

The tool 100 includes a neutron source section 120, a detection section 122, a control section 124, and a telemetry section 126. The neutron source section 120 includes a neutron source 130 (FIG. 2) that bombards the formation adjacent the tool 100 with high energy neutrons (e.g., 14 MeV). The neutron source 120 is preferably a pulsed neutron generator, which enables the precisely timed emission of neutrons. The detection section 122 includes one or more detectors that detect gamma radiation that is emitted because of interactions between emitted neutrons and the nuclei of formation elements. According to some embodiments, the detector(s) may be lanthanum bromide ($LaBr_3$) gamma ray detectors (i.e., one or more photomultiplier tubes (PMTs) equipped with $LaBr_3$ scintillation materials). Lanthanum bromide doped with cesium $LaBr_3$ (Ce) can provide excellent performance for a nuclear spectroscopy system due to its outstanding properties, which include its elevated density (5.08 g/cm3 density), high resolution, and its ultra-fast decay time (16 nanoseconds). It also provides over 90% of its normal light yield at temperatures up to 350° F. (177° C.). According to some embodiments, the length of the tool can be on the order about 10 to about 15 feet, for example, and its diameter can be about 2 to about 4 inches. Other tool geometries may be used, as will be appreciated by those of skill in the art. According to some embodiments, the distance between the neutron source 120 and the detection section 122, as well as a significant amount of internal shielding. According to some embodiments, a boron coating may be applied to the housing near the generator-detector system. Consequently, gamma rays from the housing material from slow, or thermal, neutrons can be eliminated, resulting in a significantly improved capture energy spectrum.

Control section 124 includes control circuitry that controls the operation of the neutron source section 120, detection section 122, and telemetry section 126. The telemetry section 126 includes modulation and demodulation circuitry for sending and receiving electrical signals to and from a remote device such as the processing system 112 (e.g., via wireline 108).

It should be noted that embodiments of the disclosed methods are implemented using one or more information processors, which may be any information processor known in the art, such as one or more microprocessors. Examples of processors may be configured within the tool and/or within the processing system 112. Examples of microprocessors include dual-core and quad-core processors and the like. Certain embodiments of the present disclosure may be implemented with a hardware environment that includes an information processor, an information storage medium, an input device, processor memory, and may include peripheral information storage medium. The hardware environment may be downhole, at the surface, and/or at a remote location. Moreover, the several components of the hardware environment may be distributed among those locations. The input device may be any information reader or user input device, such as data card reader, keyboard, USB port, etc. The information storage medium stores information provided by the detectors. The information storage medium may be any standard computer information storage device, such as a ROM, USB drive, memory stick, hard disk, removable RAM, EPROMS, EAROMs, EEPROM, flash memories, and optical disks or other commonly used memory storage system known to one of ordinary skill in the art including Internet-based storage. Embodiments of the information storage medium, referred to herein as a non-transitory computer readable medium, may store a computer program comprising instructions that when executed causes the information processor to execute the disclosed methods. Examples of non-transitory computer readable mediums be any standard computer information storage device, such as a USB drive, memory stick, hard disk, removable RAM, or other commonly used memory storage system known to one of ordinary skill in the art including Internet-based storage. Information processor may be any form of computer or mathematical processing hardware, including Internet-based hardware. When the program is loaded from information storage medium into processor memory (e.g. computer RAM), the program, when executed, causes information processor to retrieve detector information from either information storage medium or peripheral information storage medium and execute the disclosed methods. Information processor may be located on the surface, downhole, and/or at a remote location.

Figure 2:
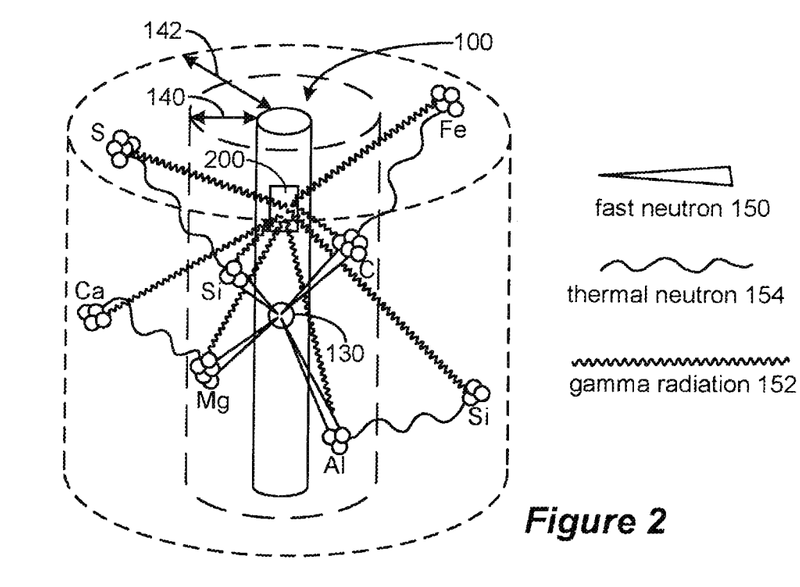
FIG. 2 shows interactions of pulsed neutrons with the environment surrounding a PN tool deployed in a borehole traversing a formation.

FIG. 2 provides a simplified view of the interactions between neutrons emitted by the tool 100 and the nuclei of neighboring atoms in the formation. Nearer to the neutron source 130 (e.g., within the radius 140), fast-moving neutrons 150 are scattered through inelastic and elastic collisions with the nuclei of atoms in the borehole and in the formation. When inelastic scattering occurs, a portion of the neutron's kinetic energy is transferred to the nucleus of the atom with which it collides, decreasing the energy of the neutron. Often, at least a portion of the energy transferred from the incident neutron to the atom's nucleus briefly activates the nucleus to an unstable, excited state. When the nucleus transitions back to a stable, ground state, it may emit gamma radiation 152 with energy that is characteristic of the atom. As the neutrons move away from the neutron source 130 and continue to lose energy, they reach thermal equilibrium with the surrounding medium. These "thermal neutrons" 154 will eventually be absorbed, i.e., "captured" by the nuclei of neighboring atoms, resulting in new isotopes of the atoms. The capture of a thermal neutron often results in the emission of gamma radiation 152 with energy that is again characteristic of the atom that captured the neutron. The different elements that interact with neutrons in the ways shown in FIG. 2 are described as "detection elements" because the gamma radiation that they produce is detectable and can be attributed to the type of element that resulted in the gamma radiation as described below.

Gamma radiation refers generally to high-energy electromagnetic radiation having an energy level that exceeds 100,000 electron Volts (100 keV). Gamma radiation 152 that is emitted because of the above-described neutron interactions (as well as naturally-occurring gamma radiation) generally has an energy between 100 keV and 10 MeV and is detected by one or more gamma radiation detectors in the tool's 100 detection section 122. Each detector may be placed near the periphery of the tool 100 to minimize the distance between the detector and the gamma radiation source, i.e., the formation 102 traversed by the wellbore 104.

Figure 3A:
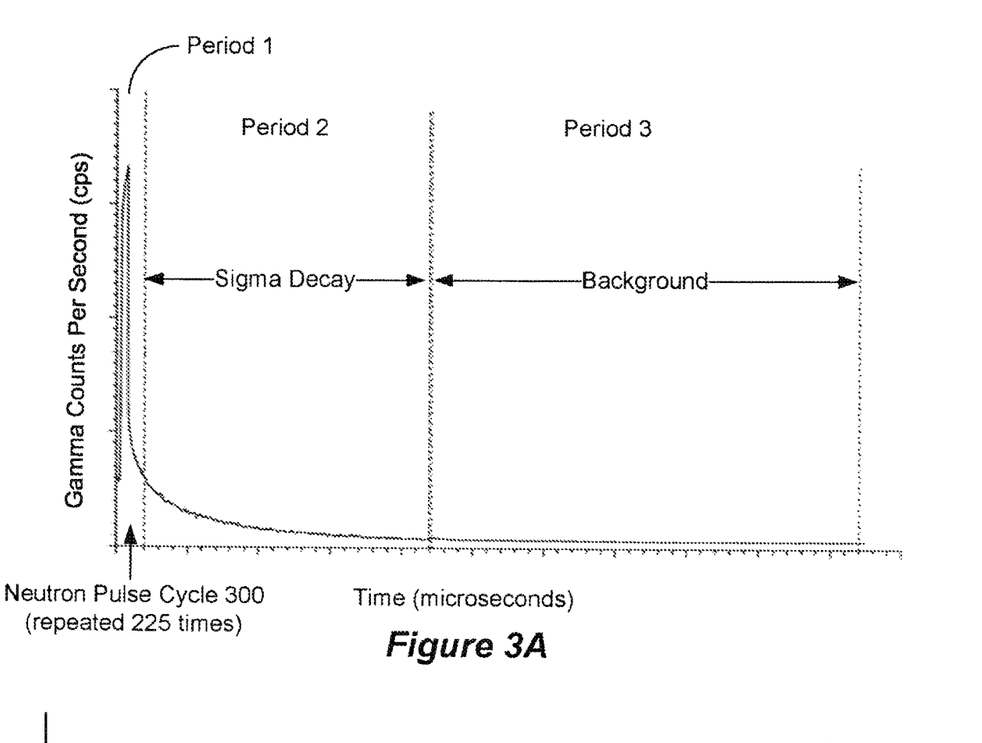
FIGS. 3A and 3B show time spectra derived from gamma photon detected during operation of a PN tool.
Figure 3B:
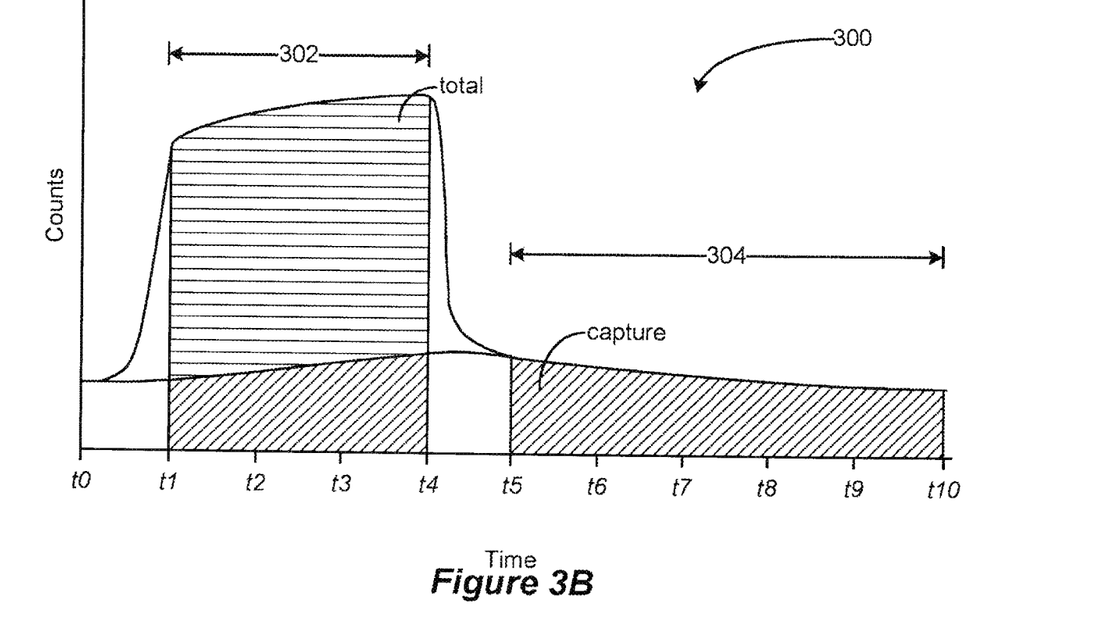

FIG. 3A illustrates the timing of the pulsed neutron tool 100. In the illustrated sequence, a neutron pulse cycle 300 is repeated 225 times, as an example. The pulsing (burst) occurs within a time period denoted Period 1 in the drawing. Period 1 also includes a time during which gamma counts are decaying. The gamma counts are due mostly to inelastic scattering and neutron capture events. FIG. 3B illustrates a single neutron pulse cycle 302 and shows an example of the total number of detected gamma radiation photons (of various different energy levels) that are observed during the course of a single neutron pulse cycle as well as the number of those total photons that are emitted as a result of a neutron capture interaction. According to some embodiments, the neutron source 130 can be pulsed at 5 kHz, so each detection cycle lasts 200 microseconds. When the neutron source 130 pulse begins at t0, the tool's one or more detectors continue to observe gamma radiation photons that are emitted as a result of neutron capture interactions associated with neutrons that were emitted during the previous neutron pulse(s).

Between t0 and t1, gamma radiation detected by the detectors sharply increases, primarily as a result of inelastic collisions between the emitted neutrons and the nuclei of formation and borehole atoms. The one or more detectors are synchronized with the source 130, and between times t1 and t4 (interval 302), the pulses are digitized by an Analog-to-Digital Converter (ADC) and the digitized pulses, or at least their magnitudes, are stored in a memory. The digitized magnitudes enable each gamma radiation photon observed by the detector to be sorted into an energy channel based on the received photon's energy. According to some embodiments, the full 0-9 MeV detection energy range is divided into 256 channels each having an energy range of approximately 35 keV although other numbers of channels (e.g., 512, 1024, or more) with different energy resolutions may also be used. The energy spectra obtained in this way can be used to determine the formation chemistry and matrix minerology as described in the incorporated references cited above, or by other techniques known in the art.

Between t4 and t5, gamma radiation sharply declines as inelastic collisions decrease to near zero (i.e., as emitted neutrons lose the energy required for inelastic interactions or move to a distance from the detectors at which such interactions are not easily detectable), and, during this time period, no pulses are stored in the memory. Between t5 and t10 (interval 304), the observed gamma radiation is caused almost exclusively by neutron capture interactions, and the magnitudes of digitized pulses are again stored in the memory. The digitized magnitudes for the pulses detected within the intervals 302 and 304 are provided from memory to a controller (e.g., a microprocessor, a microcontroller, a FPGA, or other logic circuitry). From the data corresponding to the intervals 302 and 304, the controller generates a raw total, or burst, spectrum and a raw capture spectrum, respectively.

Essentially, the raw total spectrum comprises a histogram in which each pulse recorded within the interval 302 increments a count of a particular channel based on its magnitude. Similarly, the raw capture spectrum is essentially a histogram based on the pulses within the interval 304. Each spectrum specifies a quantity of the detected gamma radiation that is within each of a plurality of energy ranges. Although not illustrated, some portion of the gamma radiation detected by the tool 100 may result from background (i.e., naturally-occurring) radiation and/or interactions of emitted neutrons with atoms in a borehole fluid or wellbore conduit (e.g., casing). The raw total and capture and inelastic spectra are processed to remove these effects, which are recorded during the Background interval, illustrated in FIG. 3A.

Referring again to FIG. 3A, the neutron pulse cycle 300 may be followed by a sigma time decay gate (e.g., 0.002 seconds, Period 2) and a background gate (e.g., 0.003 seconds, Period 3). The energy spectrum is also acquired during the burst, capture, and background gates. The energy spectrum from the background gate can be used to correct both the burst and capture energy spectra. To separate inelastic and capture gamma rays during the burst, the capture spectrum is accumulated at each interval during the log and used as an elemental standard. The advantage of this method is that variations in the amount of capture in the burst, due to changes in the borehole and formation, can more accurately be accounted for. Formation sigma can be computed from the gamma ray time-decay spectrum. In addition to being used as an asset to petrophysical interpretation, formation sigma can be used for depth control and for correlation between open and cased-hole logs. It should be noted here that the particular pulsing schemes, channelization, and timing may vary from tool to tool, but the underlying physics is generally the same.

Figure 4:
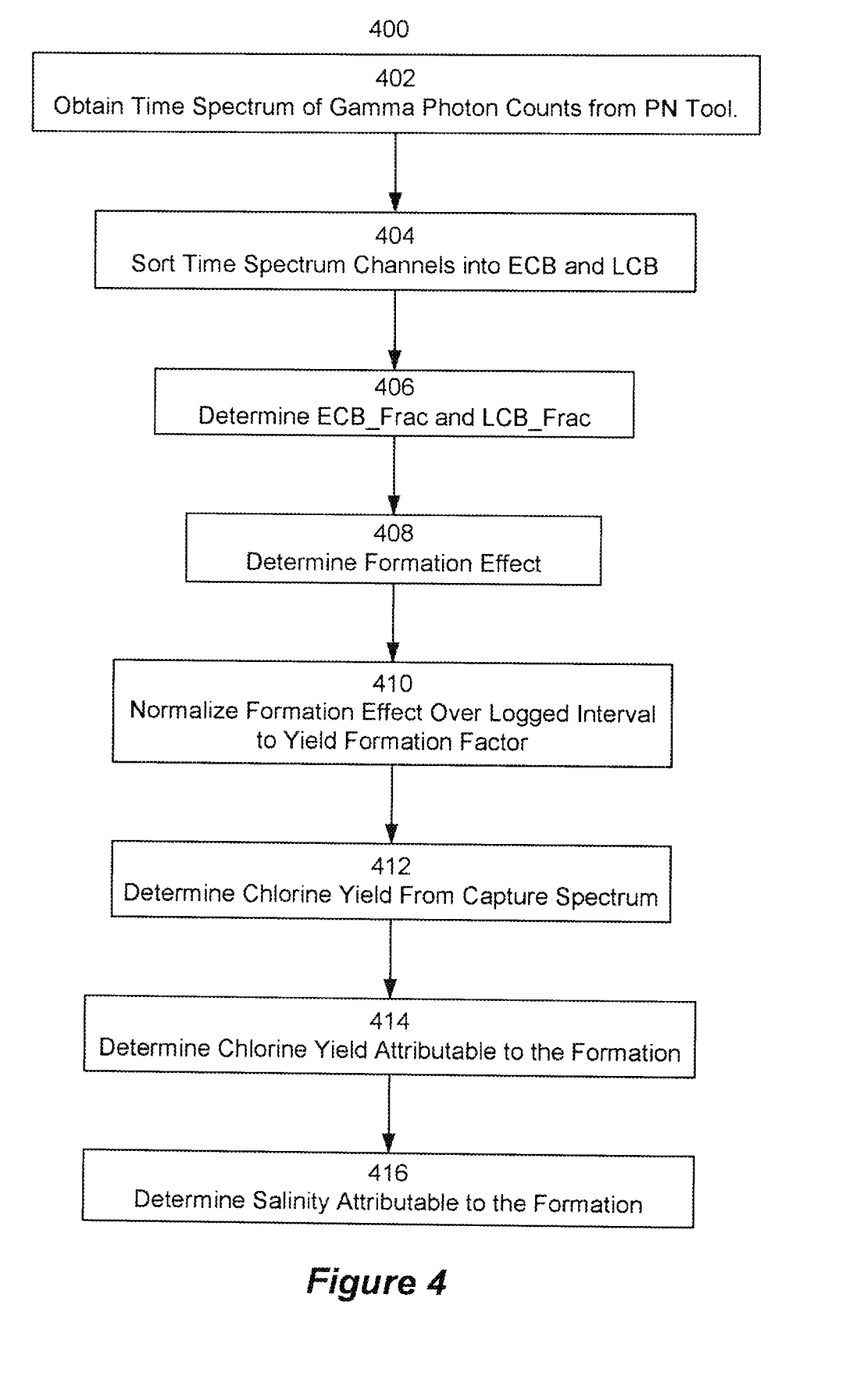
FIG. 4 shows an embodiment of a workflow for determining formation and borehole salinity using data from a PN tool.

FIG. 4 illustrates an embodiment of a workflow 400 for determining formation salinity and borehole salinity using data from a PN tool as disclosed herein. Specifically, the workflow 400 assumes that the PN tool is a geochemical logging tool, which, as described above, is capable of determining a yield of chlorine within the environment interrogated by the tool. Accordingly, the method described in the workflow 400 is referred to herein as a "elemental yield" method for determining salinity, since it is based on a determined elemental yield of chlorine.

Figure 5:
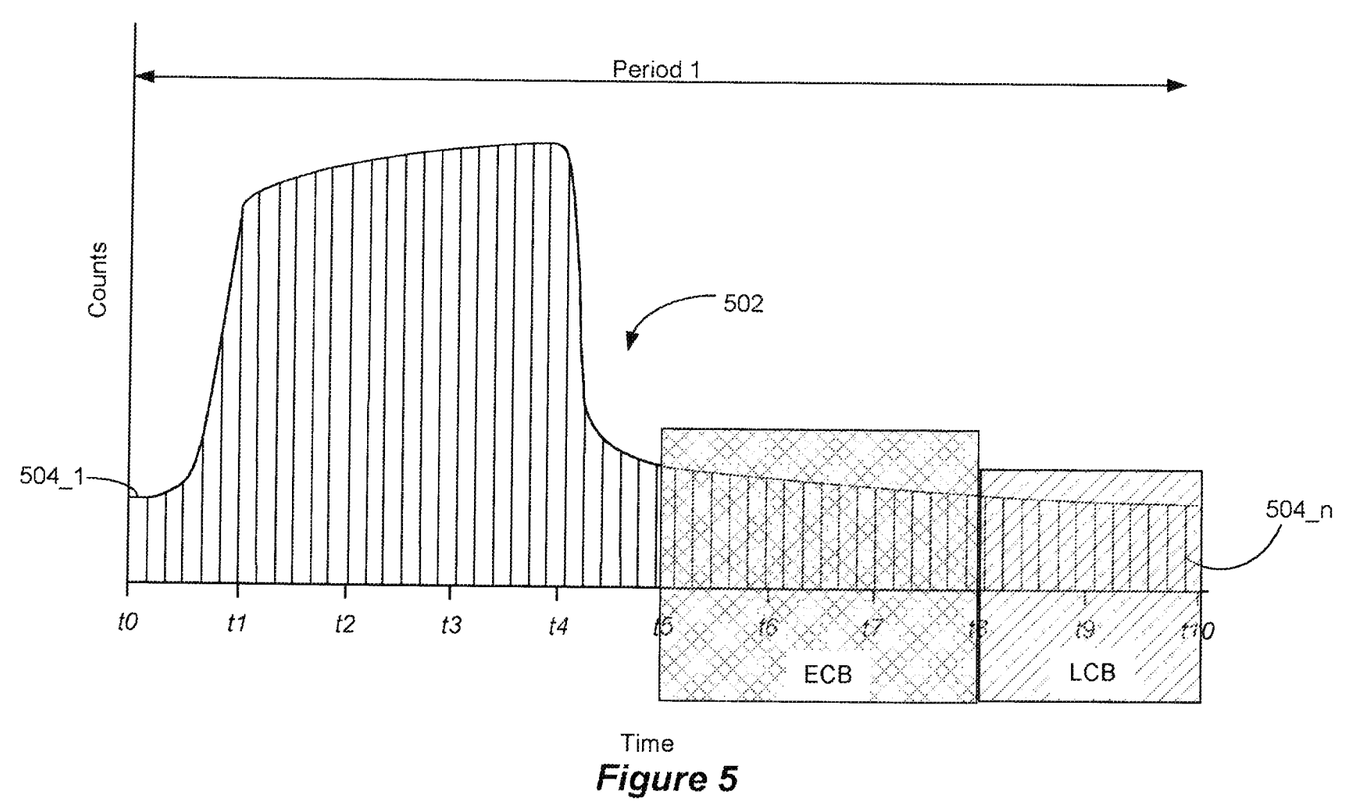
FIG. 5 shows binning of capture counts according to an embodiment of the disclosed methods.

Embodiments of the disclosed methods for salinity determinations involve obtaining a time spectrum of gamma counts from the PN tool (step 402). The time spectrum may be recorded in time channels (not to be confused with the energy channels discussed above). FIG. 5 illustrates a time spectrum 502 similar to the time spectrum shown in FIG. 3B. The portion of the time spectrum 502 illustrated in FIG. 5 occurs during Period 1 (FIG. 3A), i.e., the time during which the neutron burst occurs and decay begins. The illustrated portion of the time spectrum 502 comprises time channels (i.e., bins) 504_1 to 504_n. As explained above, the gamma photons detected during Period 1 arise primarily from inelastic scattering and neutron capture events.

Referring back to FIG. 4, step 404 involves sorting the time channels of the time spectrum into grouped pluralities of bins that are useful for the salinity calculations. Specifically, the portion of the time spectrum useful in embodiments of disclosed methods is the capture portion of Period 1 of the time spectrum. The capture portion begins after the neutron burst has ended (possibly following a short delay) and continues to the end of Period 1 (up until the portion of the spectrum that is primarily due to sigma decay). In the time spectrum 502 (FIG. 5), the capture portion of the spectrum spans from t5 to t10. According to some embodiments, the channels of the capture portion of the spectrum are sorted into a first plurality of bins, denoted ECB, for "early capture bins," and into a second plurality of bins, denoted LCB, for "late capture bins." The early and late capture bins distribution will depend on tool design and especially distance of the detector(s) from generator but also design of pulsing sequence. As will be appreciated by those of skill in the art, detector(s) should be at optimal distance from the generator to reduce the effect of neutron diffusion. The early capture bins (ECB) should comprise a portion of the time spectrum that has sensitivity to the borehole fluid effect. The late capture bins (LCB) should comprise a portion of the time spectrum that still has an adequate amount of detectable counts and that has increased sensitivity to counts arising from formation interactions.

In the time spectrum 502, the ECB includes the counts of channels included in the times from t5 to t8 and the LCB includes the counts contained in the channels in the times from t8 to t10. In the context of the disclosed methods, the ECB will contain gamma photon counts with an increased sensitivity to interactions in the borehole and the LCB will contain gamma photon counts with an increased sensitivity to interactions occurring in the formation.

Referring again to FIG. 4, step 406 of the workflow 400 involves determining the fractional contributions of the ECB counts and of the LCB counts to the total number of capture counts. The fractional contributions of the ECB counts, denoted ECB_Frac can be calculated using the formula (Eq. 1):

$$\text{ECB\_Frac} = ECB/(ECB + LCB) \qquad \text{(Eq. 1)}$$

and LCB_Frac can be calculated using the formula (Eq. 2):

$$\text{LCB\_Frac} = LCB/(ECB + LCB) \qquad \text{(Eq. 2)}$$

At step 408, a quantity referred to as Formation Effect is determined. Formation Effect can be calculated using the formula (Eq. 3):

$$\text{Formation Effect} = 1-(\text{ECB\_Frac/LCB\_Frac}) \qquad \text{(Eq. 3)}$$

The Formation Effect can be thought of as a "correction factor" or "apportionment factor" that apportions the total yield of chlorine capture counts detected at a particular depth to the chlorine counts arising from the formation. If there are an equal number of counts for ECB and LCB, then the formation factor will be zero. This is indicative of lower salinity water. A high count for ECB and low count for LCB yields a negative formation effect. A more negative Formation Effect indicates a faster decay, correlating to higher salinity values.

At step 410, the Formation Effect is normalized over the interval of depths logged to yield a normalized Formation Effect, which is referred to herein as a Formation Factor. The Formation Factor can be calculated using the formula (Eq. 4):

$$\text{Formation Factor} = \text{abs(Min\_Formation Effect)}/ \qquad \text{(Eq. 4)}$$
$$(\text{abs(Min\_Formation Effect)} + \text{Max\_Formation Effect})$$

where Min_Formation Effect and Max_Formation Effect are the minimum and maximum Formation Effects determined for the interval, and "abs" refers to the absolute value.

Figure 6:
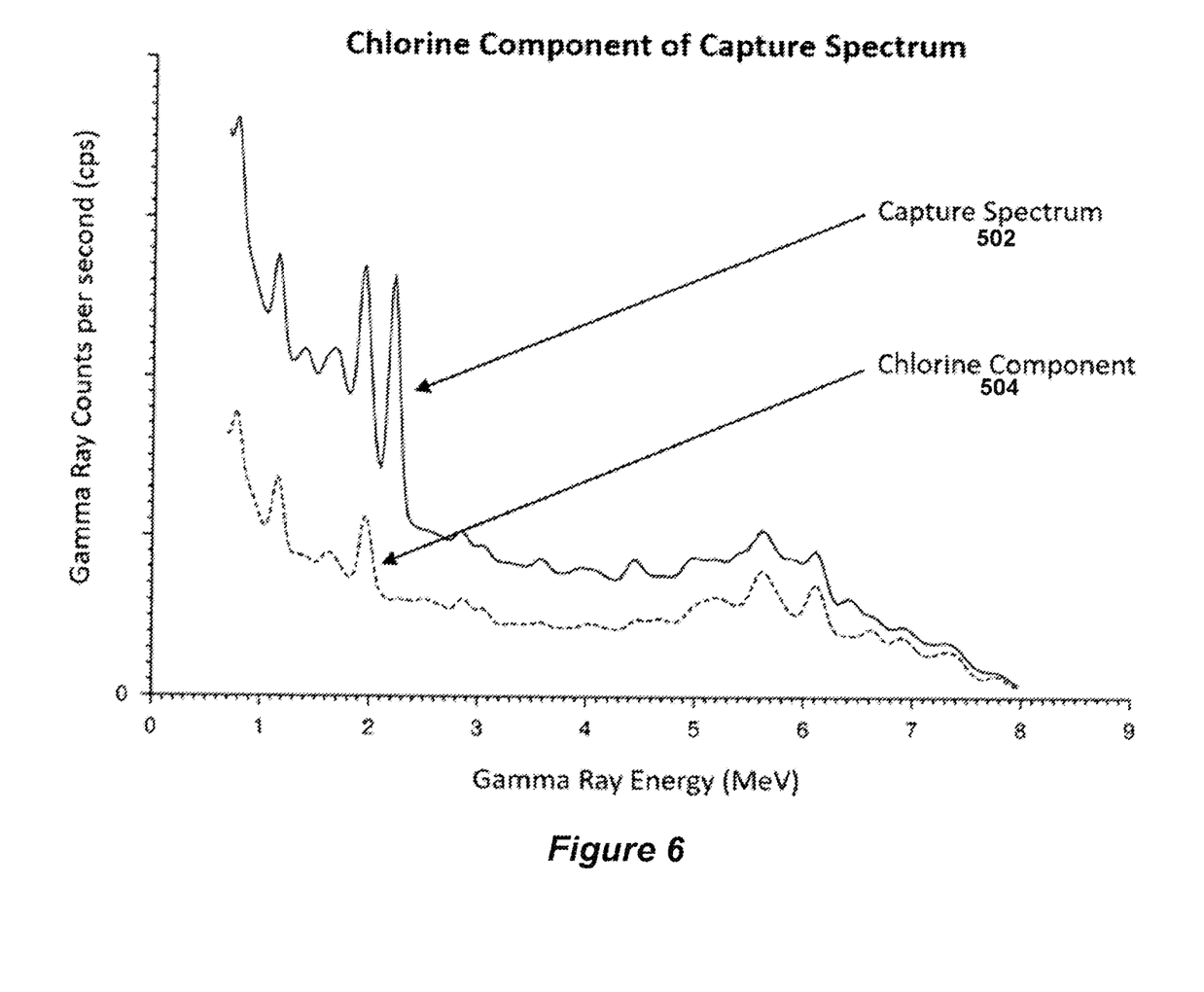
FIG. 6 shows an example of a neutron capture energy spectrum and a contribution of chlorine thereto.

The Formation Factor allows a calculation of the chlorine yield attributable to the formation. As mentioned above, the geochemical logging tool spectrographically determine a yield of chlorine in the environment interrogated by the tool based on the energies of the detected capture gamma photons. For example, FIG. 6 illustrates a capture energy spectrum 502 obtained using a geochemical logging tool. That capture spectrum can be deconvolved, for example, by using the methods described in the above-incorporated '328 Patent (or other techniques known in the art) to determine the chlorine yield's 504 contribution to the overall capture spectrum.

So, referring again to FIG. 4, step 412 comprises determining the chlorine yield for the capture spectrum acquired over the capture period. Step 414 comprising determining the chlorine yield attributable to the formation (FM_Chlorine) by multiplying the overall chlorine yield times the Formation Factor, i.e., by using the equation (Eq. 5):

$$\text{FM\_Chlorine} = (\text{Chlorine Yield}) * (\text{Formation Factor}) \qquad \text{(Eq. 5)}$$

Likewise, the chlorine yield attributable to the borehole (BH_Chlorine) be calculated using the equation (Eq. 6):

$$\text{BH\_Chlorine} = (\text{Chlorine Yield}) * (\text{Formation Factor}) \qquad \text{(Eq. 6)}$$

Step 416 comprises determining the Formation Salinity (in units of kppm) according to the formula (Eq. 7):

$$\text{Formation Salinity} = (\text{FM\_Chlorine/Chlorine Sensitivity}) * 1000 \qquad \text{(Eq. 7)}$$

Likewise, the Borehole Salinity can be calculated using the formula (Eq. 8):

$$\text{Borehold Salinity} = (\text{BH\_Chlorine/Chlorine Sensitivity}) * 1000 \qquad \text{(Eq. 8)}$$

The Chlorine Sensitivity is a factor that relates the response that will be observed with the PN tool to the actual amount of chlorine interrogated. This can be determined for each individual tools based on modeling of the tool's response. It is also related to the probability that a chlorine element will absorb neutrons and produce gamma photons that will be detected at the tool's detector. Elemental sensitivities, their use, and their calculations are well known to persons of skill in the art.

It will be apparent to a person of skill in the art that the above-described workflow 400 results in a determination of formation salinity and wellbore salinity. That workflow is based on measurements acquired using a geochemical logging tool, which provides chlorine yield as an input to the workflow. Other PN tools are known in the art, which are not technically geochemical logging tools, and which do not necessarily provide elemental yields as an output. Examples include tools that are commonly used to determine carbon-oxygen and calcium-silicon ratios, sigma measurements, pore-fluid density, and the like. Such tools often include more than one gamma photon detectors.

Figure 7:
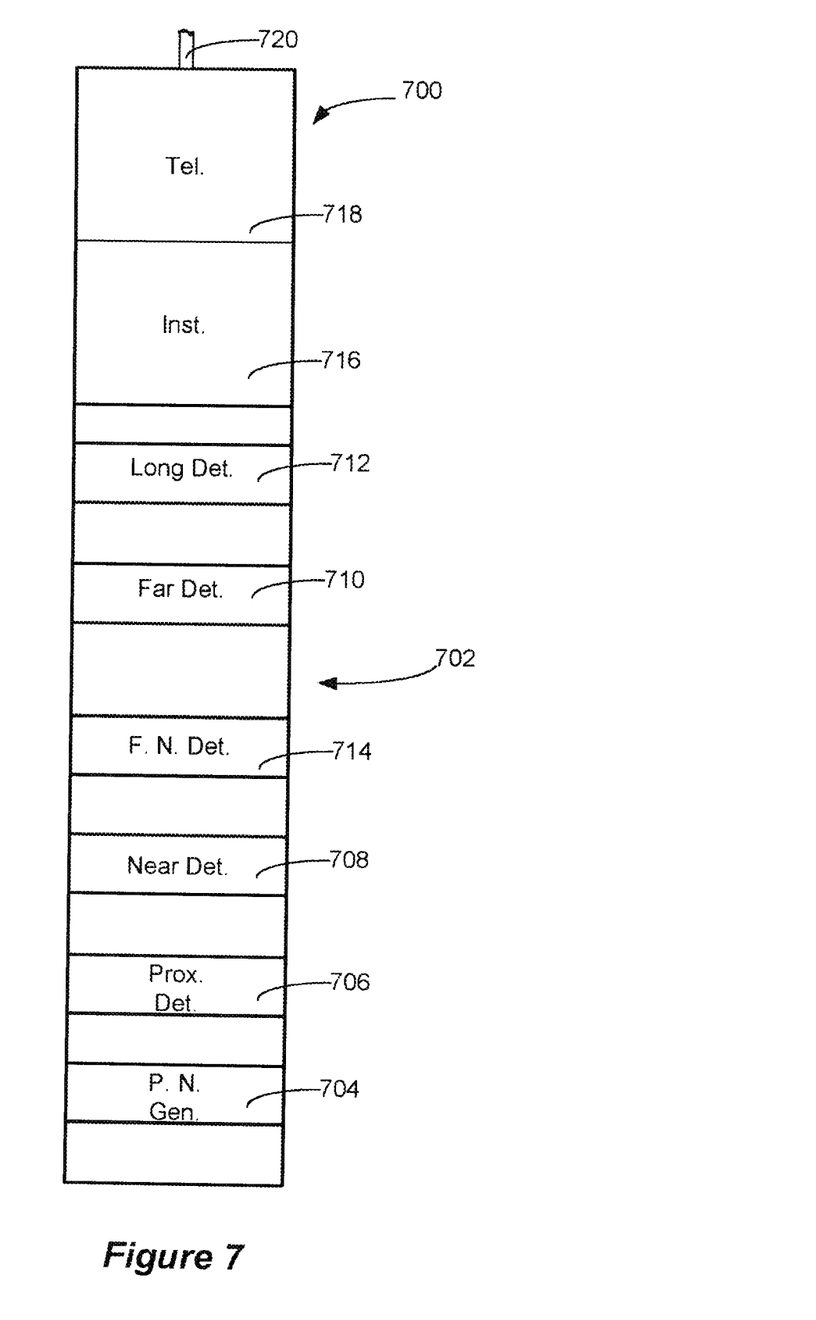
FIG. 7 shows another embodiment of a PN tool.

FIG. 7 illustrates another example of a PN logging tool 700. Subsection 702 houses an array of detector assemblies (comprising gamma photon detectors) as well as a pulsed neutron generator 704. More specifically, there are four detector assemblies in the illustrated embodiment, each comprising a lanthanum bromide ($LaBr_3$) crystal coupled to a photomultiplier tube and a digital spectrometer for filtering and pulse inspection. These detector assemblies are referred to as the Proximal (Prox) detector assembly 706, the Near detector assembly 708, the Far detector assembly 710, and Long detector assembly 712. These detector assemblies are disposed at increasing axial spacings from the neutron generator 704, as their names imply. According to some embodiments, a fast neutron detector 714 that measures the fast neutron flux may be disposed between the near detector assembly 708 and the far detector assembly. Other embodiments may not include a neutron detector.

The subsection 702 is operationally connected to an instrument subsection 716. The instrument subsection houses control circuits and power circuits to operate and control the elements of the subsection 702. A telemetry subsection 718 is operationally connected to the instrument section 716. A suitable connector connects the logging tool to a lower end of a preferably multiconductor logging cable 720. The upper end of the logging cable 720 terminates at a draw works, which is well known in the art and is not shown in the illustration. It should be noted that other embodiments of a logging tools are within the scope of the disclosure. For example, the illustrated embodiment is an example of a tool configured to be conveyed into a wellbore via a cable, such as logging cable 720. However, other embodiments may be included as a part or subsection of other conveyed components, for example, as part of a drilling string for LWD/MWD applications. Moreover, although shown embodied in a wireline logging tool, the detector assembly 702 can also be embodied in other borehole instruments. These instruments include pump-down ("memory") instruments conveyed by drilling fluid flow, instruments conveyed by coiled tubing, instruments conveyed by a drill string, and instruments conveyed by a "slick line".

The detector assembly response data are telemetered from the tool 700 to the surface of the earth where they are received by an uphole telemetry unit (not shown) typically disposed within surface equipment. These data can be processed in a surface processor (not shown) within the surface equipment to yield a log of one or more parameters of interest. Alternately, data can be partially or completely processed in a downhole processor, for example, within the instrument section 716 and telemetered via the telemetry subsection 718 to the surface equipment. Control parameters can also be telemetered from the surface equipment to the tool 700 via the telemetry system and wireline cable 720.

The neutron generator and each of the gamma photon detectors of the PN tool 700 operate in a manner similar to the operation described above with respect to the geochemical logging tool 100 (FIG. 1). Specifically, the pulsed neutron generator provides a pulse of fast neutrons to the formation and each of the gamma photon detectors are capable of detected gamma photons arising from interactions of the neutrons with the environment of the tool, as described above. Accordingly, each of the gamma photon detectors of the PN tool 700 can be configured to yield a time spectrum, such as 300 (FIG. 3) and 502 (FIG. 5).

Figure 8:
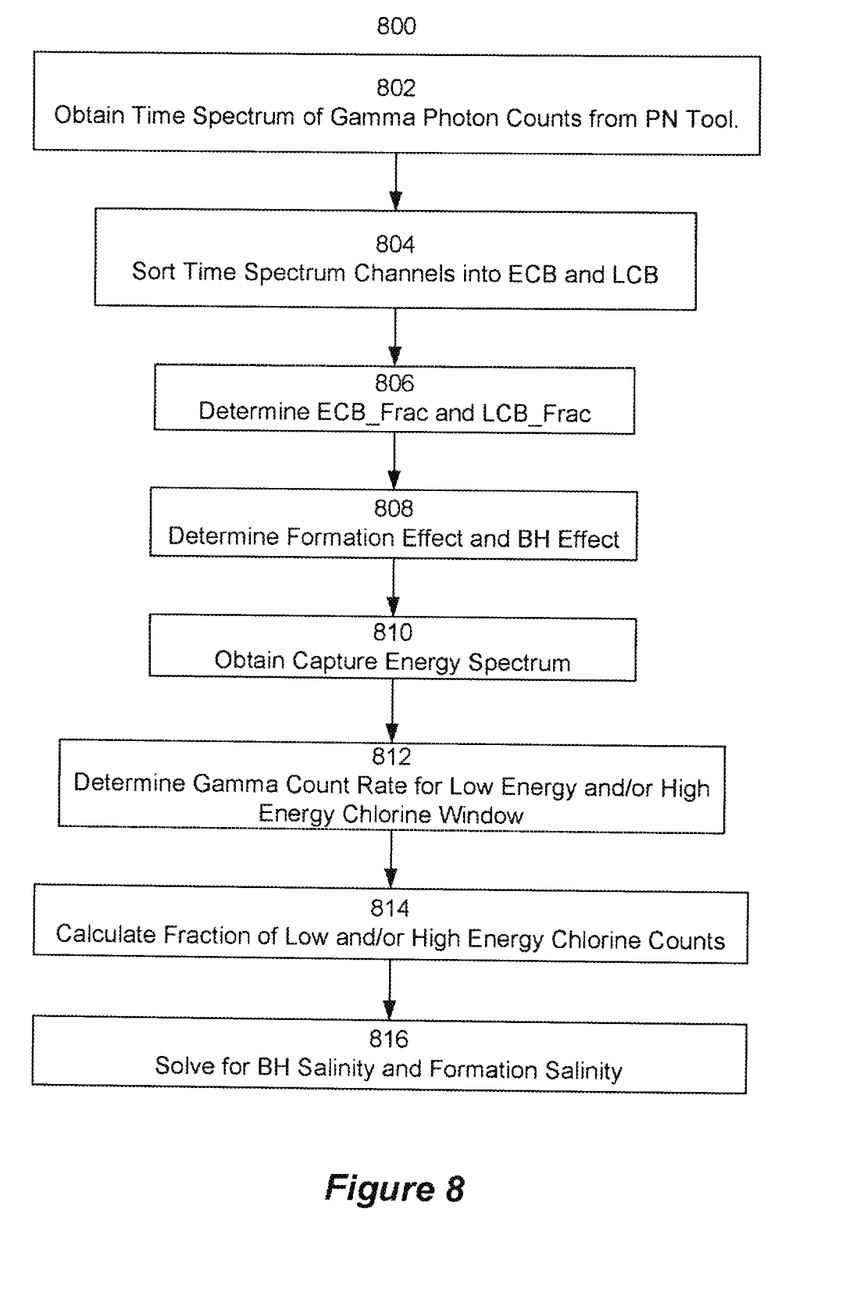
FIG. 8 shows another embodiment of a workflow for determining formation salinity using data from a PN tool.

FIG. 8 shows an embodiment of a workflow 800 for determining salinity with a PN tool 700. According to some embodiments, the steps of the workflow 800 are performed for each of the gamma photon detectors of the tool 700. As with the methods described above using the geochemical logging tool, the methods for the PN tool 700 use the time spectrum capture portion of the time spectrum (Step 802). Also, the methods involve partitioning the channels of the time spectrum into early capture bins (ECB) and late capture bins (LCB) (Step 804). This step yields a partitioned time spectrum as illustrated in FIG. 5. This partitioning may be done for each of the detectors of the PN tool 700. Step 806 involves determining the fractional contributions of the ECB and LCB to overall capture spectrum for each detector. Step 806 comprises determining a Formation Effect and borehole effect (BH Effect) for each of the detectors. The Formation Effect may be determined using the equation (Eq. 9):

$$\text{Formation Effect} = 1 - (\text{ECB\_Frac}/\text{LCB\_Frac}) \quad \text{(Eq. 9)}$$

And the BH Effect may be determined using the equation (Eq. 10):

$$\text{BH Effect} = 1 - (\text{LCB\_Frac}/\text{ECB\_Frac}) \quad \text{(Eq. 10)}$$

Equations 9 and 10 can be used with the time spectra for each detector, thereby providing Formation Effect and BH Effect values for each of the Pros, Near, Far, and Long detectors. As with the method described above, the Formation Effect and the BH Effect values can be used to apportion the contributions of the capture signal between the borehole and the formation. A difference between the two methods (i.e., between method 400 (FIG. 4) and method 800 (FIG. 8)) is that the method 400 (i.e., with the geochemical logging tool) provides chlorine yield, whereas the instant method 800 is based on count rates determined from the capture energy spectrum from one or more of the detectors (Step 810).

Figure 9:
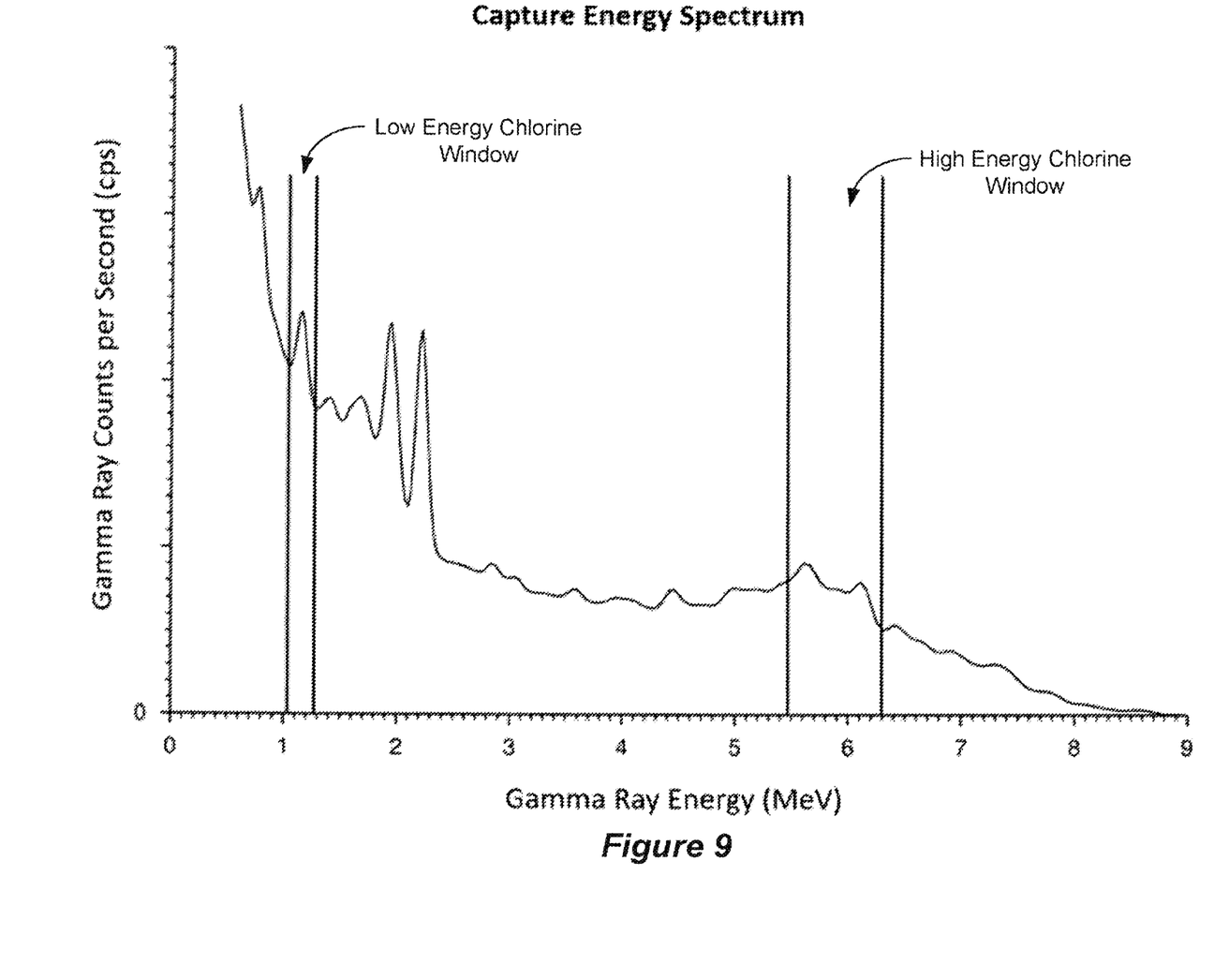
FIG. 9 shows a gamma photon capture energy spectrum with windows where gamma counts arising from chlorine capture occur.

FIG. 9 illustrates a capture energy spectrum obtained for one of the detectors. Notice that the capture energy spectrum contains a number of peaks. Peaks arising from chlorine occur at about 1.04-1.29 MeV and about 5.48-6.29 MeV. Either or both of these windows may be used to quantify the amount of chlorine present. Referring again to FIG. 8, Step 812 comprises determining the gamma photon count rate within the low energy and/or high energy chlorine window. Step 814 comprises determining the relative amount of the elemental contribution to the total spectrum for the low and high energy chlorine windows. Step 816 comprises using either the low energy or the high energy chlorine fractions to determine how the detected chlorine is distributed between the borehole (BH_Chlorine) and the formation (FM_Chlorine) using equations (Eq. 11) and (Eq. 12), respectively:

$$\text{BH\_Chlorine} = \text{(High Energy Chlorine Fraction} * \text{BH\_Effect}) * 1000 \quad \text{(Eq. 11)}$$

$$\text{FM\_Chlorine} = 1 - \text{(High Energy Chlorine Fraction} * \text{FM\_Effect}) * 1000 \quad \text{(Eq. 12)}$$

Figure 10:
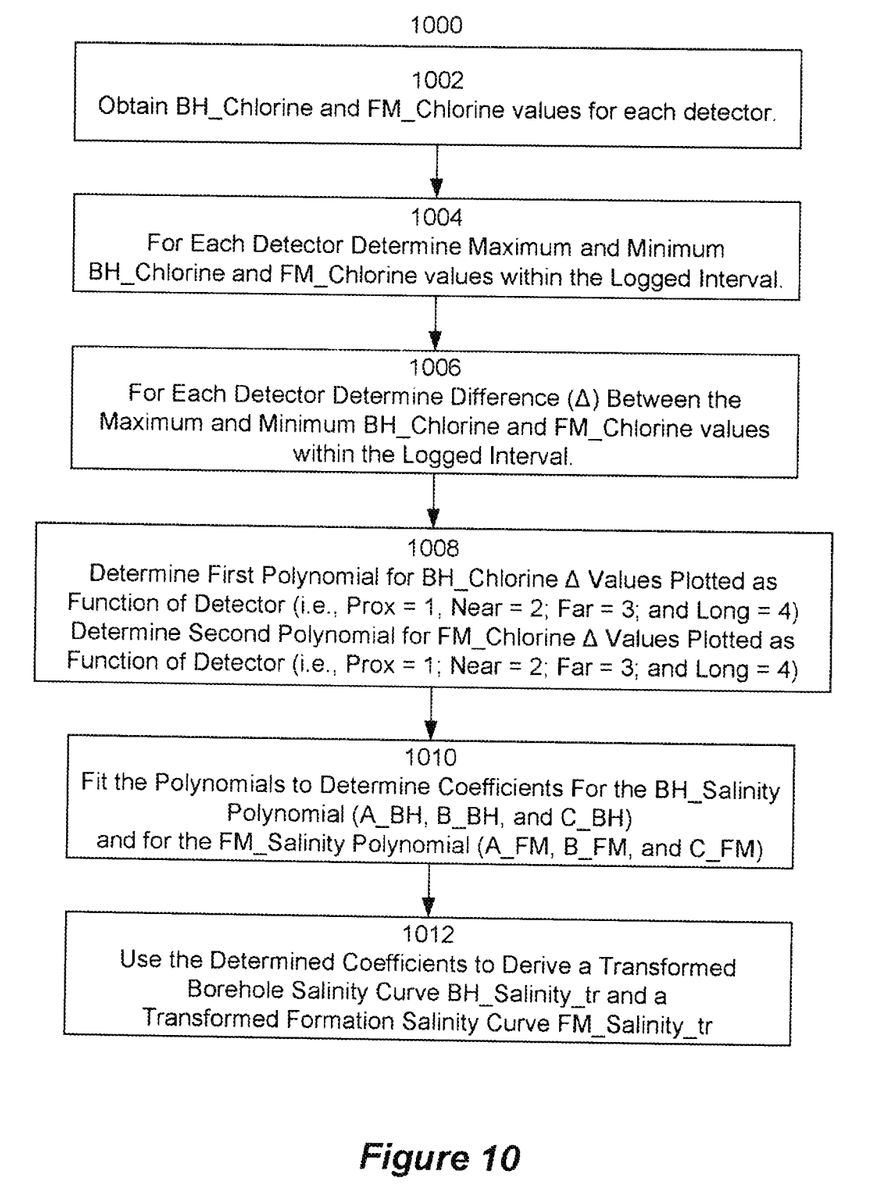
FIG. 10 shows a workflow for transforming borehole and formation salinity measurements.

For PN tools, such as the tool 700 that include multiple detectors, the salinity calculations can be further refined by using a transform derived from BH_Chlorine and/or FM_Chlorine values determined with more than one detector. FIG. 10 illustrates a workflow 1000 for performing such a transform. At step 1002, the method described in the workflow 800 is performed for each of the detectors of the tool 700 and BH_Chlorine and FM_Chlorine values are determined for each of the detectors. At step 1004 minimum and maximum BH_Chlorine and FM_Chlorine values are determined for each of the detectors for the logged interval. At step 1006, the differences (A) between the minimum and maximum BH_Chlorine and minimum and maximum FM_Chlorine values are determined for each of the detectors. At step 1008, two polynomials are determined. The first polynomial comprises the BH_Chlorine A values plotted as a function of the detector. For example, with reference to the tool 700, the A values are plotted against Prox=1; Near=2; Far=3; and Long=4. This yields a four point polynomial. The second polynomial comprises the FM_Chlorine A values plotted in the same manner. Step 1010 comprises fitting the polynomials from step 1008, for example, using regression analysis, to determine the three coefficients A, B, and C for the respective polynomials. The BH_Chlorine plot is fitted to determine the best-fit coefficients A_BH, B_BH, and C_BH. The FM_Chlorine plot is fitted to determine best-fit coefficients A_FM, B_FM, and C_FM. At step 1012, the coefficients determined at step 1010 are used to derive a transformed borehole chlorine formula (BH_Salinity_tr) and a transformed formation salinity formula (FM_Salinity_tr). The two transformed formulas are used to calculate the final derivation of the borehole and formation water salinity. The transformed borehole salinity formula is expressed as the equation (Eq. 13):

$$BH\_Salinity\_tr = (A\_BH)^2(BH\_Effect) + (B\_BH)(BH\_Effect) + C\_BH \quad (Eq.\ 13)$$

and the transformed formation salinity formula is expressed as the equation (Eq. 14):

$$FM\_Salinity\_tr = (A\_FM)^2(FM\_Effect) + (B\_BH)(FM\_Effect) + C\_FM \quad (Eq.\ 14)$$

As a further explanation of how the equations Eq. 9 through Eq. 14 relate to each other, the following may be considered. Equations Eq. 9 and Eq. 10 express how early and late capture relate to each other. Equations Eq. 11 and Eq. 12 express how chlorine counts are proportioned between the formation and the borehole, but do not provide quantitative values. Equations Eq. 13 and Eq. 14 use multiple detectors because the detectors that are further away indicate events later in time. Thus, looking at the effect across detectors elucidates the rate of change across events deeper into the formation and compensates counts for distance (i.e., normalizes). Thus, the BH_Salinity_tr and FM_Salinity_tr curves provide average and final salinity values.

Unless specifically stated otherwise as apparent from the following discussion, it is appreciated that throughout the description, discussions utilizing terms such as "processing," "receiving," "calculating," "determining," "displaying," or the like, refer to the action and processes of a computer system, or similar electronic computing device, that manipulates and transforms data represented as physical (electronic) quantities within the computer system memories or registers or other such information storage, transmission or display devices. The present disclosure also relates to an apparatus for performing the operations herein. This apparatus may be specially constructed for the required purposes, or it may comprise a general-purpose computer, selectively activated or reconfigured by a computer program stored in the computer. Such a computer program may be stored in a non-transitory computer readable storage medium, which could be, but is not limited to, any type of disk including floppy disks, optical disks, CD-ROMs, a magnetic-optical disks, read-only memories (ROMs), random access memories (RAMs), EPROMS, EEPROMs, magnetic or optical cards, application specific integrated circuits (ASICs), or any type of media suitable for storing electronic instructions, and each coupled to a computer system bus. Furthermore, the computers referred to in the specification may include a single processor, or may be architectures employing multiple processor designs for increased computing capability.

Although particular embodiments of the present invention have been shown and described, it should be understood that the above discussion is not intended to limit the present invention to these embodiments. It will be obvious to those skilled in the art that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A method of determining salinity of water in a formation traversed by a borehole using a pulsed neutron (PN) tool deployable in the wellbore, wherein the PN tool comprises a source configured to issue bursts of fast neutrons, thereby irradiating the borehole and the formation with neutrons, and at least one detector configured to detect gamma photons resulting from the irradiating and arriving at the detector, the method comprising:
   (i) receiving data from a first of the at least one of the detectors, wherein the data comprises a time spectrum of gamma photon counts, wherein the time spectrum comprises a burst duration comprising photon counts detected while the source is actively issuing fast neutrons and a capture duration comprising photon counts detected while the source is not actively issuing fast neutrons,
   (ii) binning the data into a first plurality of bins comprising gamma photon counts arising during a first duration of the time spectrum and a second plurality of bins comprising gamma photon counts arising during a second duration of the time spectrum, and
   (iii) using the first and second pluralities of bins to calculate the salinity.

2. The method of claim 1, wherein the time spectrum further comprises:
   a sigma decay duration comprising photon counts arising from sigma decay, and
   a background duration comprising photon counts arising from background radiation.

3. The method of claim 2, wherein the first and second pluralities of bins each comprise gamma photon counts detected during the capture duration.

4. The method of claim 1, wherein the first plurality of bins comprises gamma photon counts arising during an early portion of the capture duration and the second plurality of bins comprises photon counts arising during a later portion of the capture duration, wherein the later portion is later in time than the early portion.

5. The method of claim 4, wherein a majority of photon counts of the first plurality of bins result from irradiation of the borehole and wherein a majority of photon counts of the second plurality of bins result from irradiation of the formation.

6. The method of claim 1, wherein calculating the salinity comprises determining the fractional contributions of the gamma photon counts of the first and second pluralities bins, respectively, to the total number of capture gamma photon counts.

7. The method of claim 6, wherein the fractional contribution of the gamma photon counts of the first plurality of bins is determined using the formula:

$$ECB\_Frac = ECB/(ECB + LCB),$$

where ECB_Frac is the fractional contribution of the gamma photon counts of the first plurality of bins, ECB is the gamma photon counts of the first plurality of bins, and LCB is the gamma photon counts of the second plurality of bins, and wherein the fractional contribution of the gamma photon counts of the second plurality of bins is determined using the formula:

$$LCB\_Frac + LCB/(ECB + LCB),$$

where LCB_Frac is the fractional contribution of the gamma photon counts of the second plurality of bins.

8. The method of claim 7, wherein calculating the salinity comprises determining a formation effect according to the formula:

$$Formation\ Effect = 1 - (ECB\_Frac/LCB\_Frac).$$

9. The method of claim 8, wherein calculating the salinity comprises determining a formation factor by normalizing the formation effect over a logged interval using the PN tool according to the formula:

$$Formation\ Factor = abs(Min\_Formation\ Effect)/$$
$$(abs(Min\_Formation\ Effect) + Max\_Formation\ Effect)$$

where Min_Formation Effect is the minimum formation effect determined over the logged interval and Max_Formation Effect is the maximum formation effect determined over the logged interval.

10. The method of claim 1, wherein calculating the salinity comprises using an energy spectrum of capture gamma photons to spectrographically determine a chlorine yield.

11. The method of claim 9, wherein calculating the salinity comprises determining a chlorine yield attributable to the formation according to the formula:

$$FM\_Chlorine = (Chlorine\ Yield) * (Formation\ Factor)$$

where FM_Chlorine is the chlorine yield attributable to the formation.

12. The method of claim 11, wherein the salinity of water in a formation is calculated by dividing the chlorine yield attributable to the formation by a chlorine sensitivity of the PN tool.

13. The method of claim 8, wherein the PN tool comprises more than one detector and the method comprises determining a formation effect for each of the detectors.

14. The method of claim 13, further comprising, obtaining a capture energy spectrum for each detector and determining a chlorine count rate for each detector from the respective capture energy spectra.

15. The method of claim 14, further comprising using each detector's formation effect and chlorine count rate to determine, for each detector, a proportion of the chlorine count rate attributable to the formation.

16. The method of claim 15, further comprising normalizing the proportion of the chlorine count rate attributable to the formation over each of the detectors.

17. A system for determining salinity of water in a formation traversed by a borehole using a pulsed neutron (PN) tool deployable in the wellbore, wherein the PN tool comprises a source configured to issue bursts of fast neutrons, thereby irradiating the borehole and the formation with neutrons, and at least one detector configured to detect gamma photons resulting from the irradiating and arriving at the detector, the system comprising:
  a non-transitory computer readable storage medium comprising instructions, which when executed by a computer configure the computer to perform a method comprising:
    (i) receiving data from a first of the at least one of the detectors, wherein the data comprises a time spectrum of gamma photon counts, wherein the time spectrum comprises a burst duration comprising photon counts detected while the source is actively issuing fast neutrons and a capture duration comprising photon counts detected while the source is not actively issuing fast neutrons,
    (ii) binning the data into a first plurality of bins comprising gamma photon counts arising during a first duration of the time spectrum and a second plurality of bins comprising gamma photon counts arising during a second duration of the time spectrum, and
    (iii) using the first and second pluralities of bins to calculate the salinity.

18. The system of claim 17, wherein the time spectrum further comprises:
  a sigma decay duration comprising photon counts arising from sigma decay, and
  a background duration comprising photon counts arising from background radiation,
  wherein the first and second pluralities of bins each comprise gamma photon counts detected during the capture duration.

19. The system of claim 18, wherein the first plurality of bins comprises gamma photon counts arising during an early portion of the capture duration and the second plurality of bins comprises photon counts arising during a later portion of the capture duration, wherein the later portion is later in time than the early portion, and wherein a majority of photon counts of the first plurality of bins result from irradiation of the borehole and wherein a majority of photon counts of the second plurality of bins result from irradiation of the formation.

20. The system of claim 19, wherein calculating the salinity comprises determining the fractional contributions of the gamma photon counts of the first and second pluralities bins, respectively, to the total number of capture gamma photon counts.

* * * * *